United States Patent

Enokida et al.

[11] Patent Number: 5,969,066
[45] Date of Patent: Oct. 19, 1999

[54] FLUOROELASTOMER AND ITS CROSS-LINKABLE COMPOSITION

[75] Inventors: Takashi Enokida; Hajime Akimoto, both of Kitaibaraki; Haruyoshi Tatsu, Hitachi, all of Japan

[73] Assignee: Nippon Mektron, Limited, Tokyo, Japan

[21] Appl. No.: 08/912,487

[22] Filed: Aug. 18, 1997

[30] Foreign Application Priority Data

Oct. 1, 1996 [JP] Japan .................................. 8-280151

[51] Int. Cl.$^6$ ...................................................... C08F 16/24
[52] U.S. Cl. ............................................ 526/247; 526/255
[58] Field of Search ...................................... 526/247, 255

[56] References Cited

U.S. PATENT DOCUMENTS

| | | | |
|---|---|---|---|
| 4,564,662 | 1/1986 | Albin | 526/247 |
| 4,745,165 | 5/1988 | Arcella et al. . | |
| 4,920,170 | 4/1990 | Abe et al. | 526/247 |
| 4,948,852 | 8/1990 | Moore | 526/247 |
| 4,948,853 | 8/1990 | Logothetis | 526/247 |
| 4,973,633 | 11/1990 | Moore | 526/247 |
| 4,973,634 | 11/1990 | Logothetis | 526/247 |
| 4,975,502 | 12/1990 | Morita et al. | 526/247 |
| 5,032,655 | 7/1991 | Moore | 526/247 |
| 5,037,921 | 8/1991 | Carlson | 526/247 |
| 5,077,359 | 12/1991 | Moore | 526/247 |
| 5,102,965 | 4/1992 | Carlson | 526/247 |
| 5,155,282 | 10/1992 | Marchionni et al. | 526/247 |
| 5,173,553 | 12/1992 | Albano et al. | 526/247 |
| 5,214,106 | 5/1993 | Carlson et al. . | |
| 5,219,964 | 6/1993 | Albano et al. | 526/247 |
| 5,225,504 | 7/1993 | Tatsu et al. | 526/247 |

FOREIGN PATENT DOCUMENTS

| | | | |
|---|---|---|---|
| 0117450 | 9/1984 | European Pat. Off. | 526/247 |
| 0 211 251 | 2/1987 | European Pat. Off. . | |
| 0320940 | 6/1989 | European Pat. Off. | 526/247 |
| 0 407 937 A1 | 1/1991 | European Pat. Off. . | |
| 3-100039 | 9/1989 | Japan . | |

*Primary Examiner*—Bernard Lipman
*Assistant Examiner*—N. Sarofim
*Attorney, Agent, or Firm*—Barnes & Thornburg

[57] ABSTRACT

A fluoroelastomer comprising 2 to 8% by mole of tetrafluoroethylene, 14 to 25% by mole of perfluoro(alkyl vinyl ether) and 70 to 85% by mole of vinylidene fluoride, sum total being 100% by mole, obtained by copolymerization in the presence of a bromine-containing monomer compound and an iodine and bromine-containing compound, has distinguished low temperature characteristics, solvent resistance and chemical resistance by itself.

14 Claims, No Drawings

FLUOROELASTOMER AND ITS CROSS-LINKABLE COMPOSITION

BACKGROUND OF THE INVENTION

1. Field of the Invention

The present invention relates to a fluoroelastomer and its cross-linkable composition, and more particularly to a fluoroelastomer capable of giving vulcanization products having distinguished low temperature characteristics, solvent resistance and chemical resistance, and its cross-linkable composition.

2. Description of Related Art

JP-A-3-100,039 disclosing an invention made by the present applicant teaches a terpolymer comprising about 5 to about 30% by mole, preferably about 10 to about 25% by mole, of tetrafluoroethylene, about 10 to about 30% by mole, preferably about 20 to about 30% by mole, of perfluoro (methyl vinyl ether) and about 50 to about 80% by mole, preferably about 50 to about 60% by mole, of vinylidene fluoride, the sum total being 100% by mole. Comparative Example 4 thereof shows that a terpolymer of tetrafluoroethylene/perfluoro(methyl vinyl ether)/vinylidene fluoride (molar ratio: 15:25:60, which falls within a preferable copolymerization composition ratio of these comonomers) has distinguished low temperature characteristics such as a TR-10 value of $-24°$ C., but at the same time it points out poor solvent resistance and chemical resistance due to incorporation of much vinylidene fluoride having a poor chemical resistance in the terpolymer.

Thus, the above-mentioned JP-A-3-100,039 tries to improve the low temperature characteristics, solvent resistance and chemical resistance by blending the terpolymer with a copolymer of tetrafluoroethylene/perfluoro(methyl vinyl ether), where the resulting blend has such a blending proportion as about 1 to about 50 % by weight of the terpolymer and about 99 to about 50% by weight of the copolymer. That is, it cannot be denied that the former terpolymer is used rather as a modifying agent of the latter copolymer.

SUMMARY OF THE INVENTION

An object of the present invention is to provide a terpolymer of tetrafluoroethylene/perfluoro(alkyl vinyl ether)/vinylidene fluoride, which has distinguished low temperature characteristics, solvent resistance and chemical resistance by itself.

A fluoroelastomer according to the present invention comprises 2 to 8% by mole of tetrafluoroethylene, 14 to 25% by mole of perfluoro(alkyl vinyl ether) and 70 to 85% by mole of vinylidene fluoride.

DETAILED DESCRIPTION OF THE INVENTION

The present terpolymer can be obtained by subjecting tetrafluoroethylene, perfluoro(alkyl vinyl ether) having an alkyl group having 1 to 3 carbon atoms and vinylidene fluoride, sum total being 100% by mole, to copolymerization reaction in the presence of a bromine-containing monomer compound and an iodine and bromine-containing compound.

Tetrafluoroethylene is copolymerized in a proportion of 2 to 8% by mole, preferably 4 to 6% by mole. Below 2% by mole, the solvent resistance and chemical resistance, as evaluated as a methanol resistance, are lowered, whereas above 8% by mole the low temperature characteristics are deteriorated.

Perfluoro(alkyl vinyl ether) having an alkyl group having 1 to 3 carbon atoms includes, for example, perfluoro(methyl vinyl ether), perfluoro(ethyl vinyl ether), perfluoro(n-propyl vinyl ether), etc., among which perfluoro(methyl vinyl ether) is preferably used, and is copolymerized in a proportion of 14 to 25% by mole, preferably 16 to 20% by mole. Below 14% by mole changes in the hardness with time are liable to observe, whereas above 25% by mole such copolymerization is not preferable from the viewpoint of cost.

Vinylidene fluoride is copolymerized in a proportion of 70 to 85% by mole, preferably 75 to 80% by mole. Below 70% by mole the low temperature characteristics are deteriorated, whereas above 85% by mole not only the methanol resistance is lowered, but also changes in the hardness with time are liable to observe.

Glass transition temperatures Tg of homopolymers of these individual monomers are as follows:

Polytetrafluoroethylene 127° C.

Polyperfluoro(methyl vinyl ether) $-5°$ C.,

Polyvinylidene fluoride $-45°$ C.

Thus, to obtain a fluoroestomer having distinguished low temperature characteristics, it is apparent that a copolymer of vinylidene fluoride/perfluoro(methyl vinyl ether) is to be prepared and a proportion of vinylidene fluoride to be copolymerized must be increased within such a range as not to deteriorate the elastomeric properties. However, an increased proportion of vinylidene fluoride condiserably lowers the methanol resistance.

To improve the methanol resistance on the other hand, a proportion of tetrafluoroethylene or perfluoro(alkyl vinyl ether) to be copolymerized must be increased, but an increased proportion of tetrafluoroethylene considerably lowers the low temperature characteristics and an increased proportion of perfluoro(alkyl vinyl ether) lowers the low temperature characteristics, though not so lower than in the case of tetrafluoroethylene, but the perfluoro(alkyl vinyl ether) itself is an expensive monomer and a cost increase of the fluoroelastomer product is inevitable by use of an increased amount of perfluoro(alkyl vinyl ether).

According to the present invention, on the other hand, the present terpolymer containing a small proportion (2 to 8% by mole) of tetrafluoroethylene has surprisingly low temperature characteristics without any deterioration and also has a considerably improved methanol resistance, though a large amount (70 to 85% by mole) of vinylidene fluoride is coplymerized.

Mainly to attain the cost reduction, these terpolymers can be further copolymerized with fluorinated olefins, various olefin compounds, vinyl compounds, etc. to such a degree as not to inhibit the copolymerization reaction and deteriorate physical properties of vulcanization products (e. g. to not more than about 20% by mole). Fluorinated olefins include, for example, monofluoroethylene, trifluoroethylene, trifluoropropylene, pentafluoropropylene, hexafluoropropylene, hexafluoroisobutylene, chlorotrifluoroethylene, dichlorodifluoroethylene, etc. Olefin compounds and vinyl compounds include, for example, ethylene, propylene, 1-butene, isobutylene, methyl vinyl ether, ethyl vinyl ether, butyl vinyl ether, cyclohexyl vinyl ether, vinyl acetate, vinyl propionate, vinyl chloride, vinylidene chloride, trifluorostyrene, etc. Among them, at least one of vinylidene fluoride, trifluoroethylene, hexafluoropropylene, chlorotrifluoroethylene, methyl vinyl ether, etc. can be preferable used.

Copolymerization reaction can be carried out according to any polymerization method, for example, by emulsion polymerization, suspension polymerization, solution polymerization, bulk polymerization, etc., among which the emulsion polymerization method is preferable from a higher polymerization degree and the economical viewpoints. The emulsion polymerization reaction can be carried out generally at a temperature of about 20 to about 80° C. under a pressure of about 0 to about 20 kg/cm² gauge, using a water-soluble inorganic peroxide such as ammonium persulfate, etc. or its redox system as a catalyst and also using an emulsifier such as ammonium perfluorooctanoate, ammonium perfluoroheptanoate and ammonium perfluorooctanoate or their mixture, preferably ammonium perfluorooctanoate. To adjust pH in the polymerization system a buffering electrolyte such as $Na_2HPO_4$, $NaH_2PO_4$, $KH_2PO_4$, etc. or NaOH can be also used.

The copolymerization reaction is carried out in the presence of a bromine-containing monomer compound and an iodine and bromine-containing compound, preferably an iodine and bromine-containing compound represented by the general formula RBrnIm.

Bromine-containing monomer compound for use in forming cross-linkable sites includes, for example, brominated vinyl compounds or brominated olefins such as vinyl bromide, 1-bromo-2,2-difluoroethylene, perfluoroallyl bromide, 4-bromo- 1,1,2-trifluorobutene-1, 4-bromo-3,3,4,4-tetrafluorobutene-1, 4-bromo-1,1,3,3,4,4-hexafluorobutene-1, bromotrifluoroethylene, 4-bromo-3-chloro-1,1,3,4,4-pentafluorobutene-1, 6-bromo-5,5,6,6-tetrafluorohexene-1, 4-bromo-perfluorobutene-1,3,3-difluoroallyl bromide, etc., preferably,a bromine-containing vinyl ether represented by the following general formula is used:

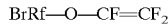

where BrRf is a bromine-containing perfluoroalkyl group having 2 to 5 carbon atoms.

The bromine-containing vinyl ether for use in the present invention includes, for example, $CF_2BrCF_2OCF=CF_2$, $CF_2Br(CF_2)_2OCF=CF_2$, $CF_2Br(CF_2)_3OCF=CF_2$, $CF_3CFBr(CF_2)_2OCF=CF_2$, $CF_2Br(CF_2)_4OCF=CF_2$, etc. Details of these compounds are disclosed in U.S. Pat. No. 4,745,165.

Besides, bromine-containing vinyl ethers presented by the following general formula, etc. as disclosed in U.S. Pat. No. 4, 564,662, can be used in the present invention:

ROCF=CFBr, or ROCBr=CF₂ where R is a lower alkyl group or a fluoroalkyl group.

The bromine-containing monomer compound is used in a proportion of about 0.001 to about 5% by weight, preferably about 0.01 to about 3% by weight, on the basis of sum total of tetrafluoroethylene, perfluoro(alkyl vinyl ether) and vinylidene fluoride. Below about 0.001% by weight the compression set characteristics of the resulting vulcanization products are deteriorated, whereas above about 5% by weight elongation of the vulcanization products is lowered.

The copolymerization reaction can be also carried out preferably in the presence of a chain transfer agent of iodine and bromine-containing compound represented by the general formula $RBr_nI_m$, where R is a fluorohydrocarbon group, a chlorofluorohydrocarbon group, a chlorohydrocarbon group or a hydrocarbon group and n and m each are 1 or 2, whereby the molecular weight can be adjusted to improve the processability.

The iodine and bromine-containing compound represented by the said general formula is selected from those which cannot lose the effects through side reactions under polymerization conditions, wherein R is selected from fluorohydrocarbon groups, chlorofluorohydrocarbon groups, chlorohydrocarbon groups or hydrocarbon groups generally having 1 to 10 carbon atoms, and each of the groups may have a functional group such as —O—, —S—, =NR, —COOH, —SO₂, —SO₃H, —PO₃H, etc.

Such iodine and bromine-containing compound may be a saturated or unsaturated linear or aromatic compound, wherein n and m each are preferably 1. The iodine and bromine-containing compound where at least one of n and m is 2 produces a fluoroelastomer of three-dimensional structure, and thus is desirable to use within such a range as not to deteriorate the processability.

The linear iodine-containing bromine compound includes, for example, 1-bromo-2-iodoperfluoroethane, 1-bromo-3-iodo-perfluoropropane, 1-bromo-4-iodoperfluorobutane, 2-bromo-3-iodoperfluorobutane, 1-bromo-2-iodoperfluoro(2-methylpropane), monobromomonoiodoperfluorocyclobutane, monobromomonoiodoperfluropentane, monobromomonoiodoperfluoro-n-octane, monobromomonoiodoperfluorocyclohexane, 1-bromo-1-iodo-2-chloroperfluoroethane, 1-bromo-2-iodo-2-chloroperfluoroethane, 1-iodo-2-bromo-2-chloroperfluoroethane, 1,1-dibromo-2-iodoperfluoroethane, 1,2-dibromo-2-iodoperfluoroethane, 1,2-diiodo-2-bromoperfluoroethane, 1-bromo-2-iodo-1,2,2-trifluoroethane, 1-iodo-2-bromo-1, 2,2-trifluoroethane, 1-bromo-2-iodo-1,1-difluoroethane, 1-iodo-2-bromo-1,1-difluoroethane, 1-bromo-2-iodo-1-fluoroethane, 1-iodo-2-bromo-1-fluoroethane, 1-bromo-2-iodo-1,1,3,3,3-pentafluoropropane, 1-iodo-2-bromo-1,1,3,3,3-pentafluoropropane, 1-bromo-2-iodo-3,3,4,4,4-pentafluorobutane, 1-iodo-2-bromo-3,3,4,4,4-pentafluorobutane, 1,4-dibromo-2-iodoperfluorobutane, 2,4-dibromo-1-iodoperfluorobutane, 1,4-diiodo-2-bromoperfluorobutane, 1,4-dibromo-2-iodo-3,3,4,4,-tetrafluorobutane, 1,4-diiodo-2-bromo-3,3,4,4-tetrafluorobutane, 1,1-dibromo-2,4-diiodoperfluorobutane, 1-bromo-2-iodo-1-chloroethane, 1-iodo-2-bromo-1-chloroethane, 1-bromo-2-iodo-2-chloroethane, 1-bromo-2-iodo-1,1-dichloroethane, 1,3-dibromo-2-iodoperfluoropropane, 2, 3-dibromo-2-iodoperfluoropropane, 1,3-diiodo-2-bromoperfluoropropane, 1-bromo-2-iodoethane, 1-bromo-2-iodopropane, 1-iodo-2-bromopropane, 1-bromo-2-iodobutane, 1-iodo-2-bromobutane, 1-bromo-2-iodo-2-trifluoromethyl-3,3,3-trifluoropropane, 1-iodo-2-bromo-2-trifluoromethyl-3,3,3-trifluoropropane, 1-bromo-2-iodo-2-phenylperfluoroethane, 1-iodo-2-bromo-2-phenylperfluoroethane, 3-bromo-4-iodoperfluorobutene-1, 3-iodo-4-bromoperfluorobutene-1, 1-bromo-4-iodoperfluorobutene-1, 1-iodo-4-bromoperfluorobutene-1, 3-bromo-4-iodo-3,4,4-trifluorobutene-1, 4-bromo-3-iodo-3, 4,4-trifluorobutene-1, 3-bromo-4-iodo-1,1,2-trifluorobutene-1, 4-bromo-5-iodoperfluoropentene-1, 4-iodo-5-bromoperfluoropentene-1, 4-bromo-5-iodo-1,1,2-trifluoropentene1, 4-iodo-5-bromo-1,1,2-trifluoropentene-1, 1-bromo-2-iodoperfluoroethyl perfluoromethyl ether, 1-bromo-2-iodoperfluoroethyl perfluoroethyl ether, 1-bromo-2-iodoperfluoroethyl perfluoropropyl ether, 2-bromo-3-iodoperfluoropropyl perfluorovinyl ether, 1-bromo-2-iodoperfluoroethyl perfluorovinyl ether, 1-bromo-2-iodoperfluoroethyl perfluoroallyl ether, 1-bromo-2-iodoperfluoroethyl methyl ether, 1-iodo-2-bromoperfluoroethyl methyl ether, 1-iodo-2-bromoethyl ethyl ether, 1-bromo-2-iodoethyl-2'-chloroethyl ether, etc. These iodine and bromine-containing compounds can be prepared according to an appropriate, known process; for example, a monobromomonoiodo, fluorine-containing olefin can be obtained by allowing a fluorine-containing olefin to react with iodine bromide.

The aromatic, iodine and bromine-containing compound includes, for example, benzenes having a substituent group such as 1-iodo-2-bromo, 1-iodo-3-bromo, 1-iodo-4-bromo, 3,5-dibromo-1-iodo, 3,5-diiodo-1-bromo, 1-(2-iodoethyl)-4-(2-bromoethyl), 1-(2-iodoethyl)-3-(2-bromoethyl), 1-(2-iodoethyl)-4-(2-bromoethyl) 3,5-bis(2-bromoethyl)-1-(2-iodoethyl), 3,5-bis(2-iodoethyl)-1-(2-bromoethyl), 1-(3-iodopropyl)-2-(3-bromo-propyl), 1-(3-iodopropyl)-3-(3-bromopropyl), 1-(3-iodopropyl)-4-(3-bromopropyl), 3,5-bis(3-bromopropyl)-1-(3-iodopropyl), 1-(4-iodobutyl)-3-(4-bromobutyl), 1-(4-iodobutyl)-4-(4-bromo-butyl), 3,5-bis(4-iodobutyl)-1-(4-bromobutyl), 1-(2-iodoethyl)-3-(3-bromopropyl), 1-(3-iodopropyl)-3-(4-bromobutyl), 3,5-bis-(3-bromopropyl)-1-(2-iodoethyl), 1-iodo-3-(2-bromoethyl), 1-iodo-3-(3-bromopropyl), 1,3-diiodo-5-(2-bromoethyl), 1,3-diiodo-5-(3-bromopropyl), 1-bromo-3-(2-iodoethyl), 1-bromo-3-(3-iodopropyl), 1,3-dibromo-5-(2-iodoethyl), 1,3-dibromo-5-(3-iodopropyl), etc. and perfluorobenzenes having a substituent group such as 1-iodo-2-bromo, 1-iodo-3-bromo, 1-iodo-4-bromo, 3,5-dibromo-1-iodo, 3,5-diiodo-1-bromo, etc.

During the polymerization reaction, the iodine and bromine of these iodine and bromine-containing compounds readily undergo radical cleavage under the action of an organic peroxide radical-generating source, and the monomers undergo addition growth reaction owing to the high reactivity of the generated radicals, and then the reaction is discontinued by withdrawing the iodine and bromine from the iodine and bromine-containing compound to give a fluorinoelastomer having iodine and bromine at the molecule terminals. The iodine atom and bromine atom bonded to the molecule terminals also act as cross-linking sites for the peroxide vulcanization.

The iodine and bromine-containing compound is bonded to the fluoroelastomer so that not more than about 5% by weight, generally about 0.001 to about 5% by weight, preferably about 0.01 to about 3% by weight in terms of iodine and bromine each may be contained in the resulting fluoroelastomer.

The present fluoroelastomer has a Mooney viscosity $ML_{1+10}$ (121° C.) of about 20 to about 100, preferably about 30 to about 80, which is described later, and can be cured by so far well known various vulcanization methods, for example, by peroxide vulcanization using an organic peroxide, polyamine vulcanization using a polyamine compound or a polyol vulcanization using a polyhydroxy compound, or by irradiation of radiation rays, electron beam, etc. Among them, peroxide vulcanization is particularly preferable, because it can give vulcanization products having distinguished resistances to chemicals, attrition and solvents, etc., where the cured elastomer gives vulcanization products having good resistances to basic substances such as amines, etc. and to nucleophilic substances.

The organic peroxide for use in the peroxide vulcanization includes, for example, 2,5-dimethyl-2,5-bis(tert-butylperoxy)hexane, 2,5-dimethyl-2,5-bis(tert-butylperoxy)-hexine-3, benzoyl peroxide, bis(2,4-dichlorobenzoyl) peroxide, dicumyl peroxide, di-tert-butyl peroxide, tert-butyl cumyl peroxide, tert-butylperoxybenzene, 1,1-bis(tert-butylperoxy)-3, 5,5-trimethyl cyclohexane, 2,5-dimetylhexane-2,5-dihydroxyperoxide, α,ω-bis(tert-butylperoxy)-p-diisopropylbenzene, 2,5-dimethyl-2,5-di(benzoylperoxy) hexane, tert-butylperoxy isopropyl carbonate etc.

In the peroxide vulcanization using the organic peroxide, a polyfunctional, unsaturated compound, such as tri(meth)allyl isocyanulate, tri(meth)allyl cyanulate, triallyl trimellitate, N,N'-m-phenylene bismaleimide, diallyl phthalate, tris(diallylamine)-s-triazine, trially phosphite, 1,2-polybutadiene, ethyleneglycol diacrylate, diethyleneglycol diacrylate, etc. can be usually used as a cocross-linking agent to obtain more distinguished vulcanization characteristics, mechanical strength and compression set.

The foregoing additive components to the peroxide vulcanization system are used in the following amounts: the organic peroxide is used in an amount of generally about 0.1 to about 10 parts by weight, preferably about 0.5 to about 5 parts by weight per 100 parts by weight of the fluoroelastomer, and the cocross-linking agent is used in an amount of generally about 0.1 to about 10 parts by weight, preferably about 0.5 to about 5 parts by weight per 100 parts by weight of the fluoroelastomer.

Furthermore, an inorganic filler such as carbon black, silica, etc.; an acid acceptor such as ZnO, CaO, $Ca(OH)_2$, MgO, PbO, synthetic hydrotalcite, etc; various pigments; a processing aid such as polyethyleneglycol monomethyl ether, Crown ether, etc.; a plasticizer such as $RfO[OCF(CF_3)CF_2O]nRf'$, $RfO[CF(CF_3)CF_2O]p(CF_2CF_2O)q(CF_2O)rRf'$, $RfO(CF_2CF_2O)n(CF_2O)mRf'$, $RfO(CF_2CF_2CF_2O)nRf'$, where Rf and Rf' each are a perfluoroalkyl group, a perfluoroalkyleneether triazine oligomer having—$(CFXOCF_2)a(CF_2)b(CF_2OCFX)c$— in the molecule, where X is F or a $CF_3$ group (see JP-A-7-285948); a stabilizer, and other necessary additives can be appropriately added to the composition containing the above-mentioned components.

The present fluoroelastomer can be further blended or cocross-linked with other substance having a peroxide cross-linkability such as silicone oil, silicone rubber, fluorosilicone rubber, fluorophosphazene rubber, ethylene-vinyl acetate copolymer, ethylene-acrylic acid ester copolymer, ethylene-propylene(-diene) copolymer rubber, acrylonitrilebutadiene copolymer rubber, acrylic acid ester rubber, etc.

The present composition can be prepared by kneading through rolls, a kneader, a Bambury mixer, etc., and its cross-linking is carried out by heating at about 140 to about 220° C. for about 5 to about 60 minutes. If required, secondary vulcanization is carried out preferably in air or in an inert atmosphere such as a nitrogen gas atmosphere at about 150 to about 250° C. for about 5 to about 50 hours.

The present fluoroelastomer per se has distinguished low temperature characteristics, solvent resistance and chemical resistance and thus can give vulcanization products having such distinguished properties on the same level as above. Further-more, the vulcanization products have no changes in the hardness with time.

PREFERRED EMBODIMENTS OF THE INVENTION

The present invention will be described in detail below, referring to Examples and Comparative Examples.

EXAMPLE 1

The following compounds were charged into an autoclave having a net capacity of 10 liters, flushed with a nitrogen gas and then deaereated under reduced pressure:

| | |
|---|---|
| Deionized water | 3660 ml |
| Ammonium perfluorooctanoate | 15 g |
| Na$_2$HPO$_4$·12H$_2$O | 11 g |
| NaOH (for pH adjustment) | 2.2 g |

Then, the following compounds were charged therein:

| | |
|---|---|
| BrCF$_2$CF$_2$I | 5 g |
| CF$_2$=CFOCF$_2$CF$_2$Br | 15 g |

Then, the following monomers were charged therein:

| | |
|---|---|
| Vinylidene fluoride [VdF] | 920.3 g (79.5 mol. %) |
| Tetrafluoroethylene [TFE] | 54.3 g (3.0 mol. %) |
| Perfluoro(methyl vinyl ether) [FMVE] | 525.4 g (17.5 mol. %) |

After charging these monomers, the internal autoclave temperature was elevated to 50° C. by stirring the autoclave. At that moment, 1.46 g of ammonium persulfate was added thereto to initiate polymerization reaction. After it was confirmed that the gauge pressure of the autoclave was zero (0) kgf/cm$^2$ after continuation of reaction for 24 hours, the internal temperature of the autoclave was cooled to room temperature.

The resulting latex was salted out by adding an aqueous 1% calcium chloride solution thereto and dried, whereby 1,470 g of white elastomer was obtained (yield of polymerization: 98%). It was confirmed by $^{19}$F-NMR analysis that the fluoroelastomer had a molar ratio of VdF/TFE/FMVE= 80.0/2.8/17.2. The Mooney viscosity ML$_{1+10}$ (121° C.) was 53 pts.

Examples 2 to 3 and Comparative Examples 1 to 2

In Example 1, proportions of monomers to be charged were changed to those as shown in the following Table 1.

TABLE 1

| | | Ex. 2 | Ex. 3 | Comp. Ex. 1 | Comp. Ex. 2 |
|---|---|---|---|---|---|
| [Monomer charged (weight)] | | | | | |
| VdF | (g) | 889.4 | 844.1 | 967.6 | 814.5 |
| TFE | (g) | 89.6 | 141.6 | — | 175.5 |
| FMVE | (g) | 521.0 | 514.3 | 532.4 | 510.0 |
| [Composition of monomer charged] | | | | | |
| VdF | (mol. %) | 77.5 | 74.5 | 82.5 | 72.5 |
| TFE | (mol. %) | 5.0 | 8.0 | — | 10.0 |
| FMVE | (mol. %) | 17.5 | 17.5 | 17.5 | 17.5 |
| [Composition of fluoroelastomer formed] | | | | | |
| VdF | (mol. %) | 77.6 | 74.9 | 82.7 | 72.4 |
| TFE | (mol. %) | 5.0 | 7.9 | — | 10.3 |
| FMVE | (mol. %) | 17.4 | 17.2 | 17.3 | 17.3 |
| [Amount of fluoroelastomer formed] | | | | | |
| Amount | (g) | 1455 | 1470 | 1455 | 1485 |
| Yield | (%) | 97 | 98 | 97 | 99 |
| [Viscosity of fluoroelastomer formed] | | | | | |
| ML$_{1+10}$ (121° C.) | (pts) | 48 | 57 | 55 | 50 |

The following compounds were added to 100 parts by weight of each of fluoroelastomers obtained in Examples 1 to 3 and Comparative Examples 1 and 2 and the resulting mixtures were each kneaded through two-roll mill:

| | |
|---|---|
| MT carbon black | 20 parts by weight |
| 2,5-dimethyl-2,5-di-(t-butylperoxy)hexane | 1.5 parts by weight |
| Lead oxide (PbO) | 3 parts by weight |
| Triallyl isocyanurate | 4 parts by weight |

The kneaded product were subjected to press vulcanization (primary vulcanization) at 180° C. for 10 minutes and then to oven vulcanization (secondary vulcanization) in a nitrogen gas atmosphere at 200° C. for 22 hours. The resulting vulcanization sheets were then determined for normal state physical properties (according to DIN 53505 and 53504), changes in the hardness with time (according to ASTM D-2240-81), low temperature characteristics (as evaluated as TR-10 and TR-70), methanol vesistance (as evaluated as percent volume change by dipping in methanol at 60° C. for 70 hours) and compression set (according to ASTM D-395; method B), and the results are shown in the following Table 2.

TABLE 2

| | | Example | | | Comp. Ex. | |
|---|---|---|---|---|---|---|
| | | 1 | 2 | 3 | 1 | 2 |
| [Normal state physical properties] | | | | | | |
| Hardness (Shore A) | (pts) | 69 | 69 | 69 | 70 | 70 |
| 100% modulus | (MPa) | 4.7 | 4.9 | 5.0 | 4.8 | 5.1 |
| Tensile strength | (MPa) | 23.0 | 23.3 | 23.8 | 23.1 | 24.0 |
| Elongation | (%) | 270 | 260 | 250 | 260 | 230 |
| [Changes in hardness with time] | | | | | | |
| Shore A | (pts) | ±0 | ±0 | ±0 | +2 | ±0 |
| [Low temperature characteristics] | | | | | | |
| TR-10 | (° C.) | −33.1 | −33.7 | −33.0 | −32.9 | −29.5 |
| TR-70 | (° C.) | −23.5 | −23.9 | −23.1 | −17.1 | −20.0 |
| [Methanol resistance] | | | | | | |
| Percent volume change | (%) | +98.8 | +80.5 | +61.3 | +140 | +55.5 |
| [Compression set] | | | | | | |
| 200° C. for 70 hrs. | (%) | 27 | 25 | 24 | 29 | 25 |

It can be said from the foregoing results that:

(1) In Examples 1 to 3, where some portion of vinylidene fluoride of Comparative Example 1 was replaced with tetrafluoroethylene, the methanol resistance was increased with increasing proportion of tetrafluoroethylene to be copolymerized, and the low temperature characteristics was not deteriorated but rather improved in spite of incorporation of tetrafluoroethylene, and the TR-70 value was obviously improved without any changes in the hardness with time.

(2) But, in Comparative Example 2, where the tetrafluoroethylene proportion was further increased the low temperature characteristics were deteriorated.

What is claimed is:

1. A fluoroelastomer which comprises 2 to 8% by mole of tetrafluorethylene, 14 to 25% by mole of perfluoro(alkyl vinyl ether) having an alkyl group having 1 to 3 carbon atoms and 70 to 85% by mole of vinylidene fluoride, sum total being 100% by mole.

2. A fluoroelastomer according to claim 1, wherein the fluoroelastomer is obtained by copolymerization in the presence of a bromine-containing monomer compound and an iodine and bromine-containing compound.

3. A fluoroelastomer according to claim 2, wherein the bromine-containing monomer compound is a brominated vinyl compound.

4. A fluoroelastomer according to claim 3, wherein the brominated vinyl compound is a bromine-containing vinyl ether represented by the following general formula:

BrRf—O—CF=CF$_2$ where BrRf is a bromine-containing perfluoroalkyl group.

5. A fluoroelastomer according to claim 2, wherein the bromine-containing monomer compound is a brominated olefin.

6. A fluoroelastomer accoding to claim 2, wherein about 0.001 to about 5% by weight of the bromine-containing monomer compound is used on the basis of sum total of tetrafluoroethylene, perfluoro(alkyl vinyl ether) and vinylidene fluoride.

7. A fluoroelastomer according to claim 2, wherein about 0.01 to about 3% by weight of the bromine-containing monomer compound is used on the basis of sum total of tetrafluoroethylene, perfluoro(alkyl vinyl ether) and vinylidene fluoride.

8. A fluoroelastomer according to claim 2, wherein the iodine and bromine-containing compound is a compound represented by the general following formula:

RBrnIm where R is a fluorohydrocarbon group, a chlorofluorohydrocarbon group, a chlorohydrocarbon group or a hydrocarbon group, and n and m each are 1 or 2.

9. A fluoroelastomer according to claim 2, wherein the iodine and bromine-containing compound is bonded to the resulting fluoroelastomer in an amount of about 0.001 to about 5% by weight in terms of iodine and bromine, respectively.

10. A fluoroelastomer accoding to claim 2, wherein the iodine and bromine-containing compound is bonded to the resulting fluoroelastomer in an amount of about 0.01 to about 3% by weight in terms of iodine and bromine, respectively.

11. A cross-linkable composition, which comprises a fluoroelastomer comprising 2 to 8% by mole of tetrafluoroethylene, 14 to 25% by mole of perfluoro(alkyl vinyl ether) having an alkyl group having 1 to 3 carbon atoms and 70 to 85% by mole of vinylidene fluoride, sum total being 100% by mole, and a peroxide cross-linking agent.

12. A cross-linkable composition according to claim 11, wherein a cocross-linking agent comprising a polyfunctional unsaturated compound is further contained.

13. A cross-linkable composition, which comprises a fluoroelastomer comprising 2 to 8% by mole of tetrafluoroethylene, 14 to 25% by mole of perfluoro(alkyl vinyl ether) having an alkyl group having 1 to 3 carbon atoms and 70 to 85% by mole of vinylidene fluoride, sum total being 100% by mole, obtained by copolymerization in the presence of a bromine-containing monomer compound and an iodine and bromine-containing compound, and a peroxide cross-linking agent.

14. A cross-linkable composition according to claim 13, wherein a cocross-linking agent comprising a polyfunctional unsaturated compound is further contained.

* * * * *